United States Patent [19]
Frick et al.

[11] Patent Number: 5,036,351
[45] Date of Patent: Jul. 30, 1991

[54] EXPOSURE CONTROL PROCESS AND PHOTOGRAPHIC COLOR COPYING APPARATUS

[75] Inventors: Beat Frick, Buchs; Walter Kraft, Zürich, both of Switzerland

[73] Assignee: Gretag Systems, Seattle, Wash.

[21] Appl. No.: 589,799

[22] Filed: Sep. 28, 1990

[30] Foreign Application Priority Data

Sep. 29, 1989 [CH] Switzerland .................. 3550/89

[51] Int. Cl.⁵ .................. G03B 27/86; G03B 27/32
[52] U.S. Cl. .................. 355/38; 355/77
[58] Field of Search .................. 355/32, 35, 38, 68, 355/77

[56] References Cited

U.S. PATENT DOCUMENTS

| | | | |
|---|---|---|---|
| 4,092,067 | 5/1978 | Grossmann | 355/77 |
| 4,101,216 | 7/1978 | Grossmann | 355/38 X |
| 4,274,732 | 6/1981 | Thurm et al. | 355/38 |
| 4,422,752 | 12/1983 | Thurm et al. | 355/41 |
| 4,589,766 | 5/1986 | Fürsich et al. | 355/38 |
| 4,692,794 | 9/1987 | Suzuki | 355/38 X |
| 4,728,996 | 3/1988 | Matsumoto | 355/77 |
| 4,769,679 | 9/1988 | Matsumoto | 355/77 X |
| 4,769,695 | 9/1988 | Terashita | 355/38 X |
| 4,779,987 | 10/1988 | Umemoto et al. | 355/38 X |
| 4,827,526 | 5/1989 | Matsumoto | 355/77 X |
| 4,837,711 | 6/1989 | Suzuki | 355/38 X |
| 4,951,084 | 8/1990 | von Stein et al. | 355/38 |

FOREIGN PATENT DOCUMENTS

2515370  4/1983  France.
631554  1/1978  Switzerland.

*Primary Examiner*—Richard A. Wintercorn
*Attorney, Agent, or Firm*—Burns, Doane, Swecker & Mathis

[57] ABSTRACT

A exposure control process and a photographic color copying apparatus make possible the optimal adaptation of the evaluation of a copy master to the varying spectral sensitivities of different copy materials, without having to change the measuring filters. The measuring light components of each of the basic colors are detected by a wavelength selective detection device in at least two closely adjacent spectral ranges and the resultant measured values combined into prevailing color extract values.

29 Claims, 7 Drawing Sheets

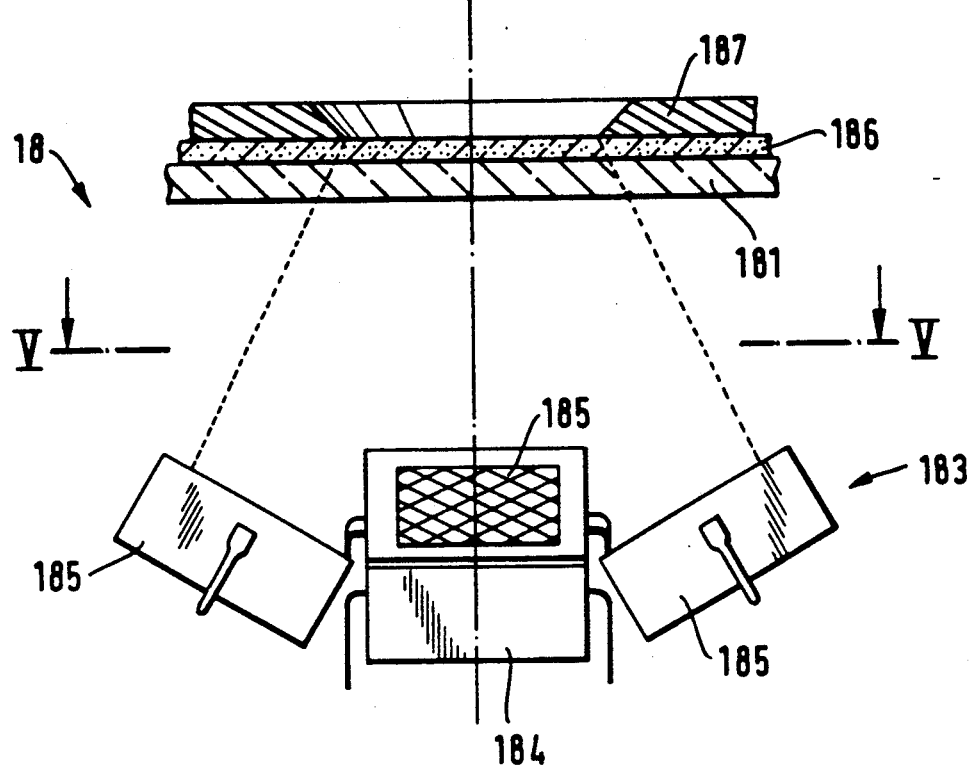
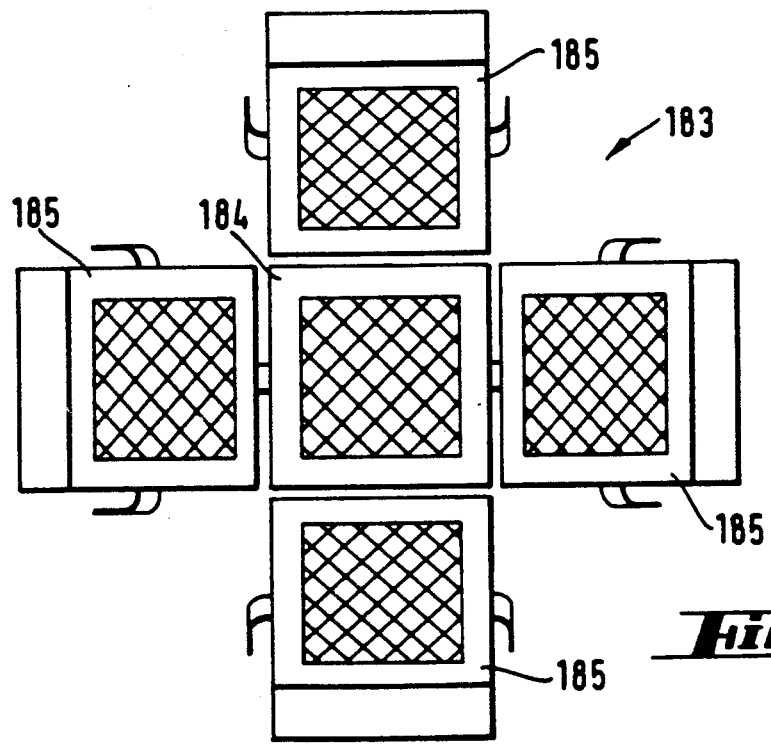

EXPOSURE CONTROL PROCESS AND PHOTOGRAPHIC COLOR COPYING APPARATUS

BACKGROUND OF THE INVENTION

The invention concerns a process for the control of exposure in a photographic color copying apparatus.

To determine the optimum exposure times and quantities of copying light in a photographic color copying apparatus the color permeabilities or color densities of a copy master in the three basic colors are determined. It is necessary in the process to adapt the spectral sensitivity of the measuring apparatus as accurately as possible to the spectral sensitivity of the copy material used. This requirement is the result of the experience when deviations of the spectral sensitivities of the measuring layout and the copy material occur, an increase in the density of a color of the copy master does not lead to a corresponding change in the quantity of copying light and that color falsification may therefore result. This is discussed for example in the publication by R. W. G. Hunt, "The Reproduction of Color", p. 284.

From U.S. Pat. No. 4,589,766 a photographic color copying apparatus is known, wherein an attempt is made to satisfy this requirement by means of special optical measuring filters. The disadvantage of this method is apparent when different copy materials are used, for example with matte or glossy surfaces. For every change of copy material, new measuring filters adapted to the altered spectral sensitivities of the copy material must be used, which considerably increases costs and requires additional setup times. Furthermore, in view of the extreme precision required, these measuring filters are very difficult to produce and are therefore expensive. Another expense is caused by the logistic management of the different measuring filters adapted to the spectral sensitivities of the copy material. In addition, the choice of a certain set of measuring filters in most cases restricts the user to a certain type of copy material of a certain manufacturer.

SUMMARY OF THE INVENTION

The present invention eliminates these disadvantages and solves the problem of determining the color extract values which govern the correct exposure settings and which adapt to the copy material used without having to change the optical measuring filters. The solution according to the invention is also relatively simple in its design and may be carried out in a cost effective manner.

BRIEF DESCRIPTION OF THE DRAWINGS

Other objects and advantages will become apparent from the following discussion of preferred embodiments of the invention when read in conjunction with reference to the drawings wherein:

FIG. 4 shows a schematic lateral elevation of a variant of a wavelength selective detection apparatus of the present measuring apparatus;

FIG. 5 is a top view of the detection apparatus of FIG. 4;

DETAILED DESCRIPTION OF THE PREFERRED EMBODIMENTS

The photographic color copy apparatus according to the invention is essentially formed of two stations, through which a preferably strip-shaped copy master N passes in succession. The direction of transport is indicated by the arrow F. In the first station the copy master N is scanned and in the second station the copy master N is reproduced on a photosensitive copy material P.

Figure 1:
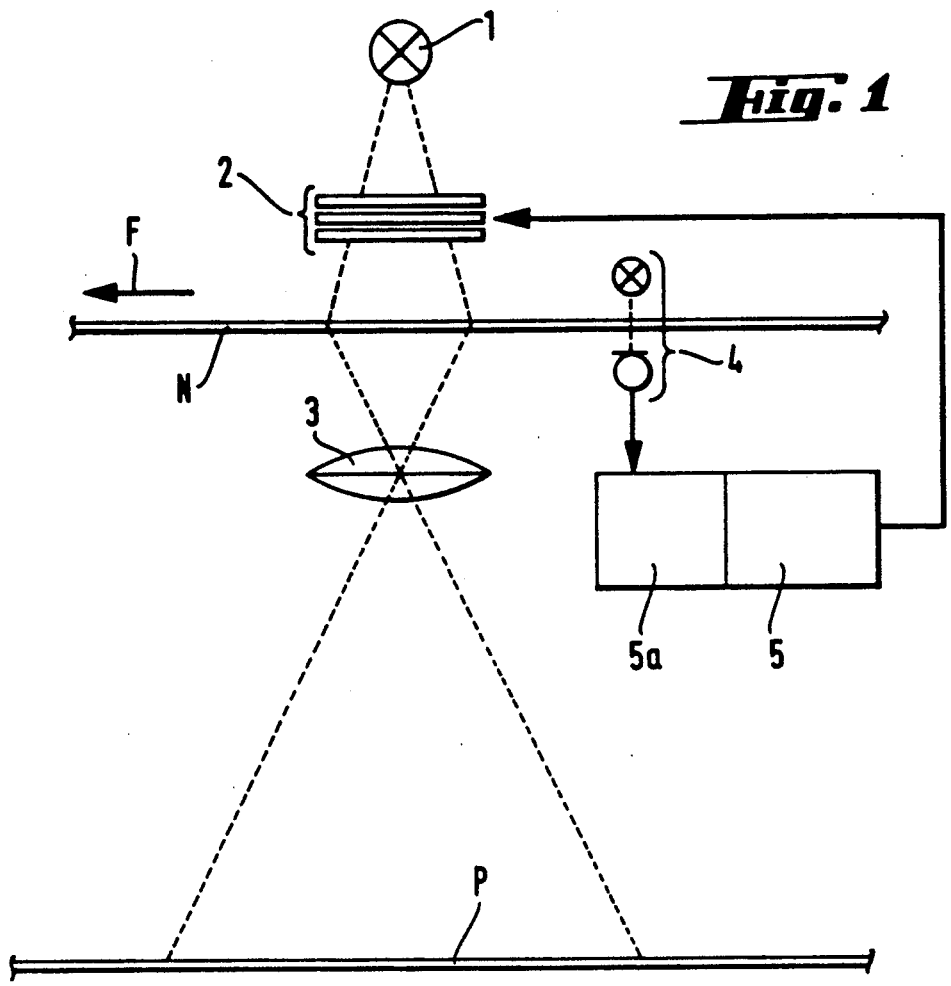
FIG. 1 is an overall diagram of an exemplary photographic color copying apparatus according to the invention.

With the exception of the differences to be explained later, in the measuring apparatus of the first station the photographic color copy apparatus is constructed in a manner similar to that of conventional devices of this type, for example those known from U.S. Pat. No. 4,092,067, U.S. Pat. No. 4,101,216 and U.S. Pat. No. 4,279,505. In FIG. 1, therefore only the essential components necessary for the understanding of such a color copy apparatus are shown.

With reference to FIG. 1, a color copy apparatus has a copy light source 1, a set of servo-controlled color filters 2 or the like, an imaging optical device 3, a measuring layout 4 including a source of measuring light and photoelectric detectors and a computer and control unit 5, 5a for exposure control. Photographic color copy devices of this fundamental design are for example the well-known and widely used high capacity printer models 3139, 3140, 3141 or 3142 of the present applicant. In the aforementioned high capacity printers the copy master N is measured in sections, for example with a resolution of about 100 scanning areas A (points) per master or more. Each scanning area A is resolved into the three basic colors: red R, green G and blue B and a triplet of measured values, the three so-called color extract values for the basic colors which correspond approximately to the spectral sensitivities of the copy material P. These approximately 300 color extract values are evaluated in a known manner by different criteria to determine the necessary quantities of copying light to subsequently control the exposure of the photosensitive copy material P.

Figure 3:
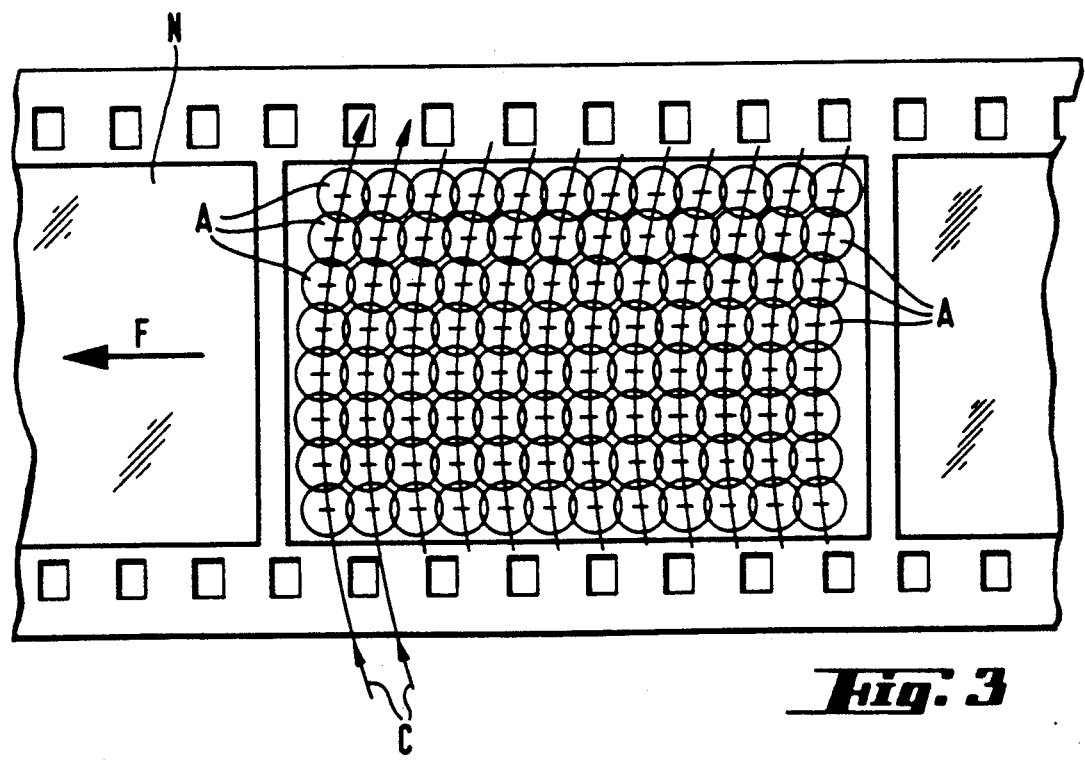
FIG. 3 shows a scanning pattern of a copy master.
Figure 2:
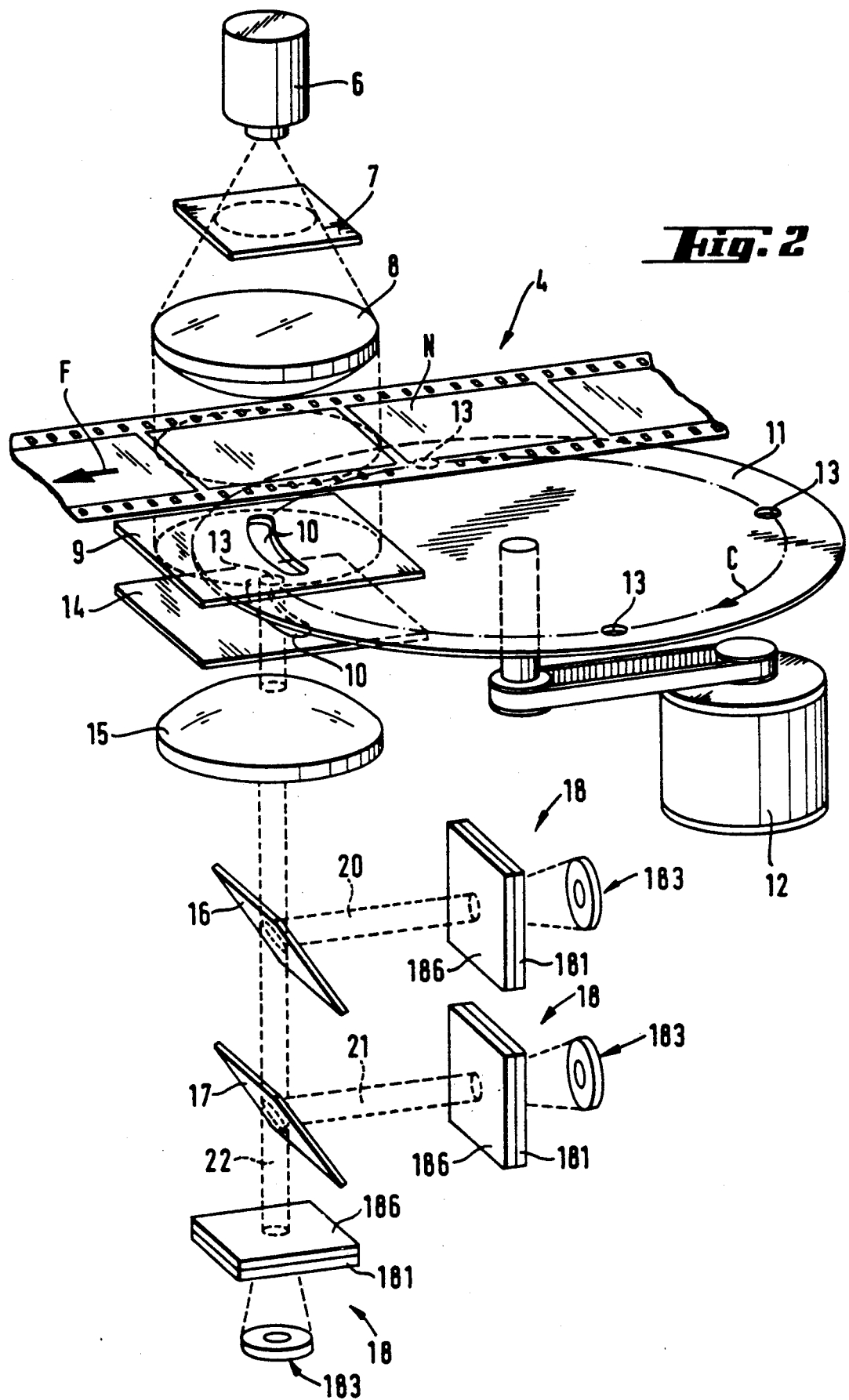
FIG. 2 shows a measuring apparatus designated by the symbol 4 in FIG. 1.

FIG. 2 shows the measuring layout designated by 4 in its entirety. The copy master N is located in the beam path of a source of measuring light 6. Immediately following the source of measuring light 6 is a prefilter 7, which adapts the spectral composition to the measuring light as required. The measuring light passes through a first condenser lens 8 onto the copy master N. Under the copy master N the scanning device itself is located. The scanning device is formed of a scanning disk 11 having apertures 13 and placed rotatingly in the direction of the arrow R between two parallel slit diaphragms 9 and 14. A motor 12 is provided to drive the scanning disk 11. Each of the slit diaphragms 9 and 14 has a slit 10 in the form of a circular arc. The location of slits 10 usually coincide over each other. However, their mutual position may be altered in a manner such that the effective slit length may be adapted to the existing format of the copy master N (for example, 135 or 110 films). The width of the slits 10 and their curvature is correlated with the diameter of the apertures 13 and the distance of the axis of rotation of the scanning disk 11. In an exemplary embodiment the scanning disk 11 has four apertures 13 which briefly let the measuring light pass through while the disk rotates in the direction of the arrow R along the effective slit length. In this manner, the copy master is divided into individual, point shaped scanning areas A. FIG. 3 shows a typical resultant scanning pattern of a copy master, in which the scanning areas A are located in lines adjacent to each other. Each line extends approximately perpendicularly to the direction of transport P. The slightly curved shape of the lines away from the transport direction P is the consequence of the superposition of the transport in the direction P of the copy master N and the rotation R of the apertures 13 of the scanning disk. Following its passage through the scanning device, the measuring light passes through a second condenser lens 15 and onto a partially permeable blue mirror 16, which preferably is placed inclined about 45° relative to the beam path. The blue component of the measuring light is deflected by the blue mirror 16, which for the rest of the light merely represents a permeable glass plate. The remaining part of the measuring light then arrives at a partially permeable red mirror 17, which deflects the red component of the light and allows only the remaining green component to pass. The blue and the red mirrors preferably are dichroitic mirrors. In this manner, the measuring light is resolved into its three basic colors blue, red and green.

In the beam path 20, 21, 22 for each basic color (blue B, red R and green G), a wavelength selective detection device 18 is provided. This comprises in an exemplary embodiment a filter 181 correlated with each basic color and located essentially perpendicularly to the beam path, and a photoelectric detector layout 183. The filter 181 is a transmission interference filter, preferably a dielectric bandpass, preceded by a scatter disk 186. To limit the width of the measuring beam, an aperture diaphragm 187 may be provided, as indicated in FIGS. 4 and 6.

Figure 6:
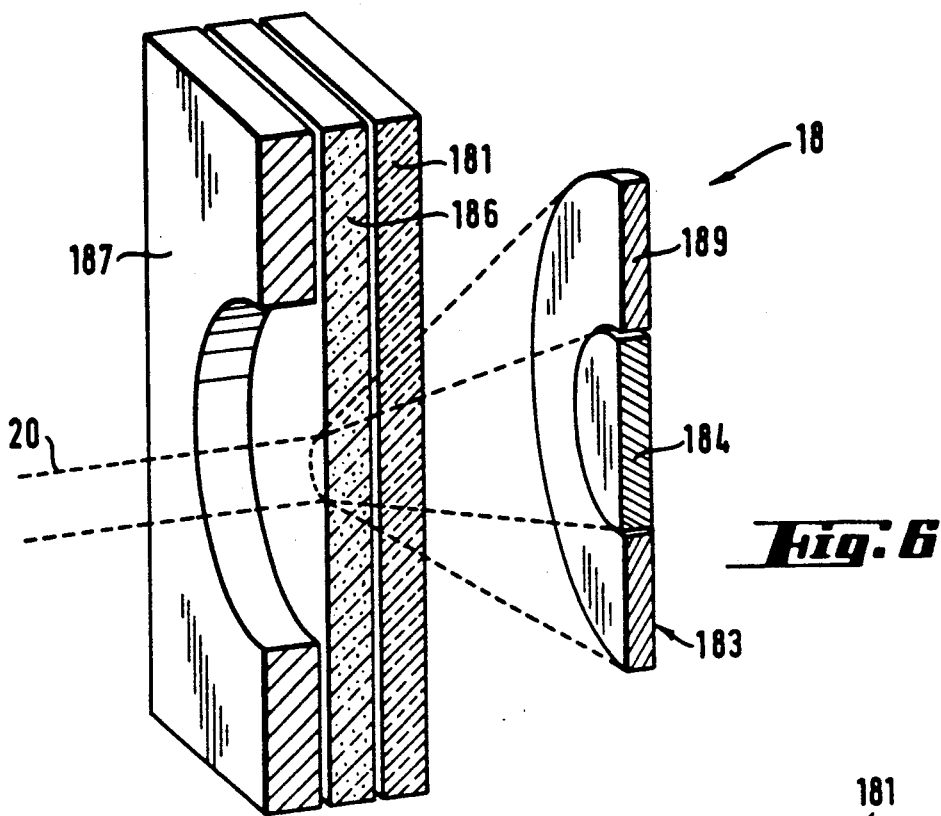
FIG. 6 shows a wavelength selective detection apparatus according to the embodiment of the measuring apparatus shown in FIG. 2.

The photoelectric detector layout 183 is shown in FIGS. 4 to 6. As shown in FIGS. 4 and 5 the detector layout 183 includes for example five individual detectors, arranged in the shape of a cross. In particular, a center detector 184 is surrounded by four peripheral detectors, which are preferably inclined with their light inlet surface toward the filter 181 as shown in FIG. 4. By this layout of the photoelectric detectors, the peripheral detectors 185 form a different angle with the beam path of the filter normal than does the center detector 184. In this manner the peripheral detectors 185 cover a spectral range slightly offset relative to the one covered by the center detector 184 for each basic color (blue B, green G or red R) involved, since the spectral transmission of the interference filter 181 fundamentally depends on the angle at which the measuring light is detected. In particular, the central transmission process of the interference filter is displaced in the direction of shorter wavelengths with increasing angles between the beam and the filter normal. However, these spectral areas usually overlap. The layout of the detectors is preferably such that the intensity maxima (k and m in FIG. 11) are separated by a distance approximately corresponding to the half width value (b in FIG. 11) of the interference filter 181. The distance amounts to about 5-35 nm, and preferably about 20 nm.

FIG. 6 shows another variant of the detector layout 183. In this example the center detector 184 is circular in shape. The peripheral detector is formed of a single annular photoelectric detector 189 surrounding the central detector 184.

As will be apparent to those skilled in the art, the detector layout 183 is not restricted to the examples shown in FIGS. 4 to 6. For example, it is also possible to merely provide at least two adjacent individual detectors, each of which covers a different angular range of the measuring light cone coming from the filter 181. The detector layout 183 could also be designed so that more than two concentric angular ranges of the measuring light cone coming from the filter 181 are detected. For example, several annular detectors may be grouped concentrically around a center detector.

Figure 7:
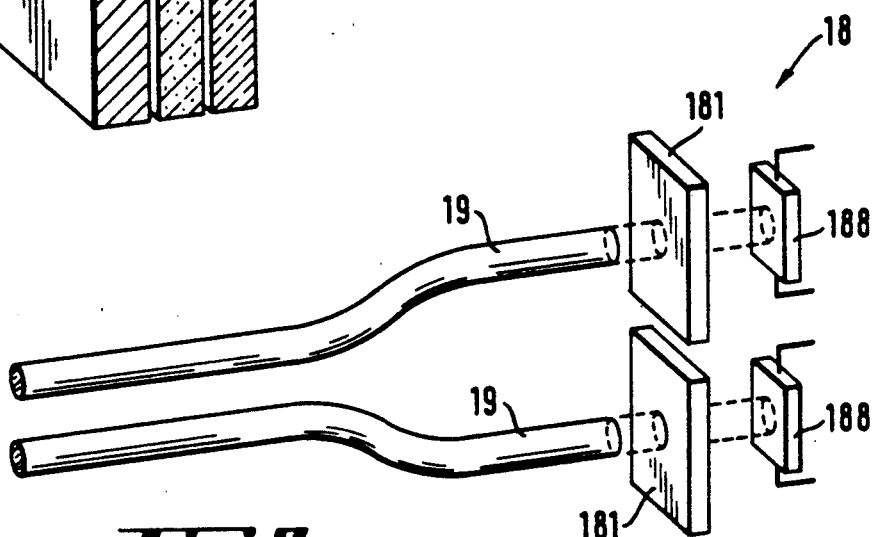
FIG. 7 shows another embodiment of a wavelength selective detection apparatus.
Figure 8:
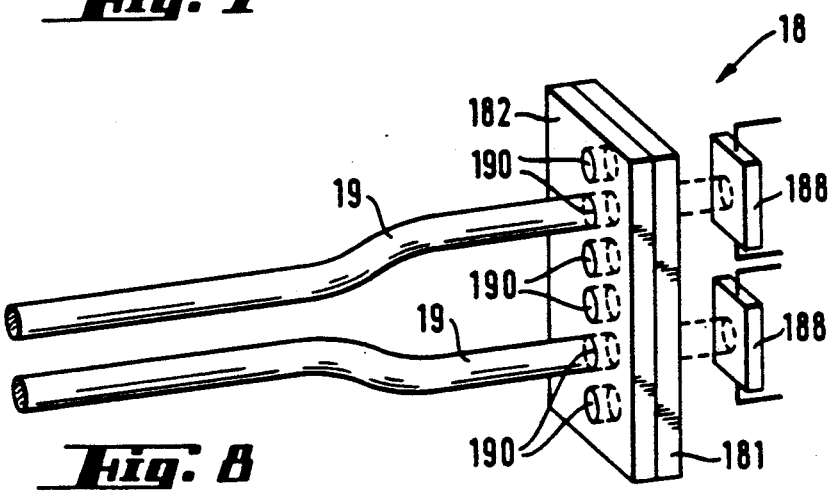
FIG. 8 shows a further embodiment of a wavelength selective detection apparatus.

FIGS. 7 and 8 display two further exemplary embodiments of the wavelength selective detection device 18. Optical fibers 19 are located in the beam path 20, 21 or 22 of each of the basic colors; in the example shown there are at least two optical fibers. At the outlet of the optical fibers 19, a wavelength selective detection device 18 is located. The latter is formed in the FIG. 7 embodiment with a filter 181 for each optical fiber, preferably a transmission filter, and an individual detector 188 on each filter. The transmission ranges of adjacent filters 181 preferably overlap. The transmission maxima (k and m in FIG. 11) of immediately adjacent filters are separated by a distance corresponding approximately to the half-width value (b in FIG. 11) of the transmission ranges of the filters 181 and amount to about 5-35 nm, preferably to about 20 nm.

In the example of FIG. 8, the outlets of the two or more optical fibers 19 for each basic color are directed at a single graduated filter 181, which preferably is a transmission filter. The graduated filter has a spectral transmission graduation that is variable over its length. Beginning with a certain transmission range in the long wave range of each basic color (blue B, green G or red R) the range is displaced over the length of the filter to shorter wavelengths. The graduated filter is preferably an interference filter. Between the filter 181 and the optical fibers 19 a printed card 182 is located. The card 182 has over its length at least two plug-in openings 190. The optical fibers 19 may be inserted into any of these openings 190. For selection of which of the plug-in openings 190 is to be used for the optical fibers 19, certain areas with defined spectral transmission ranges are separated in the graduated filter. Preferably, the plug-in locations for the optical fibers 19 are selected so that the transmission ranges of adjacent areas overlap on the graduated filter 181. Photoelectric detectors 188 are arranged after the graduated filter, each of which is located exactly opposite the associated optical fiber 19. The transmission maxima (k and m in FIG. 11) of immediately adjacent areas are separated by a distance a, which corresponds approximately to a half-width value (b in FIG. 11) of the graduated filter 181. Usually this distance amounts to about 5-35 nm, preferably about 20 nm. After the graduated filter, individual filters are located in the beam path 20, 21 or 22 of each basic color exactly opposite one of the optical fibers 19.

Preferably, the graduated filter 181, the card 182 and the individual detectors 188 form a single unit. They may be combined in a common holder, but may also be bonded together into a compact block.

Figure 9:
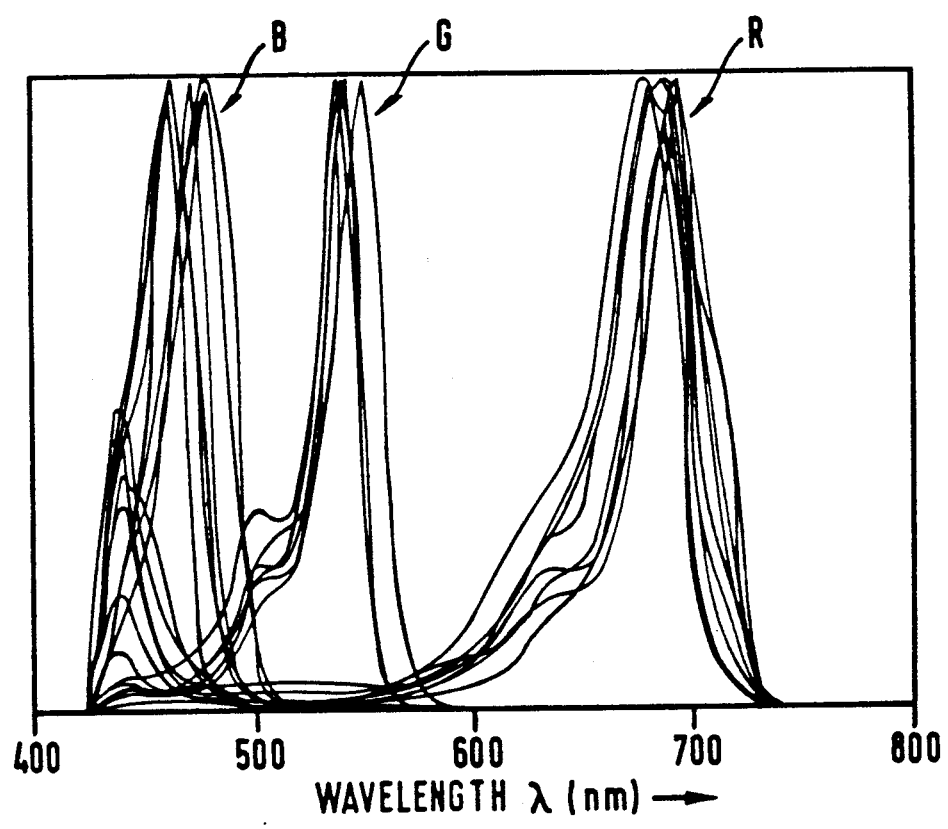
FIGS. 9–13 are graphs illustrating an exemplary process according to the invention.

In the embodiments shown in FIGS. 7 and 9 the optical fibers 19 are shown, to expose the separate filters and the individual areas of the graduated filters to the measuring light. This is also possible without the optical fibers 19, for example, by resolving the measuring beam coming from the beam splitter mirror 16 or 17 into several partial beams via beam splitters or the like. The filters 181 are described as transmission filters, but reflection filters or other wavelength selective optical elements may also be used. A photographic color copying apparatus according to the invention is again not restricted to necessarily having in the beam path of each of the basic color the same type of a wavelength selective detection device 18. Also, the detector layouts 183 in the beam path 20, 21 or 22 of the measuring light in the basic colors of blue B, green G or red R are not necessarily identical. Depending on the requirements and the spectral sensitivities of the copy materials P used, different wavelength selective detection devices 18 with different detector layouts 183, in particular relative to the number of detectors and thus of the adjacent spectral areas covered within each of the basic colors, may be provided in the beam path of the measuring light of each of the basic colors.

The measuring light of the source 6 is passed through the pre-filter 7 and the first condenser lens 8 onto the copy master N. By the combination of the transport movement of the copy master N in the direction of the arrow P, the rotation of the scanning disk 11 according to the arrow R and the sequential electric measurements, the copy master N is scanned by lines and resolved into "point shaped" areas A. The measuring light coming from the individual scanning sections A is passed through a second condenser lens 15 onto a partially permeable blue mirror 16. The blue component of the measuring light is deflected in the direction of the wavelength selective detection device 18 for the color blue. The rest of the measuring light passes through the blue mirror without impediment and is finally split by a red mirror into the basic colors red and green. The red and green components are again passed to their wavelength selective detection devices 18. In the wavelength selective detection devices 18 the measuring light in the basic colors blue B, green G or red R is detected in at least two closely adjacent spectral areas. The measuring values contained in this manner are then passed to the control and computer unit 5, 5a where they are combined into the prevailing color extract value. The entirety of the color extract values (with about 100 to 1000 scanning points A for each basic color, a total of about 300 to 3000 values) are subsequently evaluated in a known manner by different criteria to determine the quantities of copying light and then the exposure of the photosensitive copy material P regulated.

FIG. 9 shows the spectral sensitivities of different copy materials P. It is seen in the graph that these spectral sensitivities for the basic colors blue B, green G and red R are scattered over a relatively wide wavelength range. Relative to the sensitivity maxima for example of the basic color red R, the scatter range extends over up to 20 nm and more.

Figure 10:
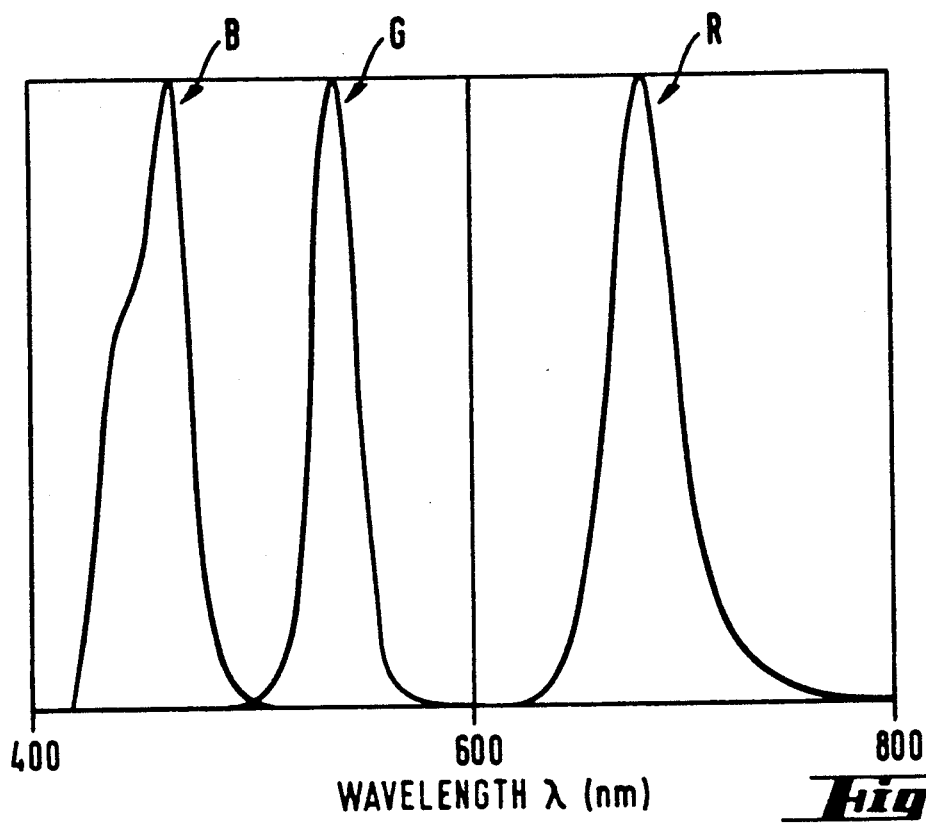

In FIG. 10, the transmission variations of conventional transmission filters for the basic colors of blue B, green G and red R are compiled in a diagram. A comparison of the filter transmission variations with the spectral sensitivities of the copy materials P clearly indicates that such filters are very rarely adapted in an optimal manner to the copy material used.

Figure 11:
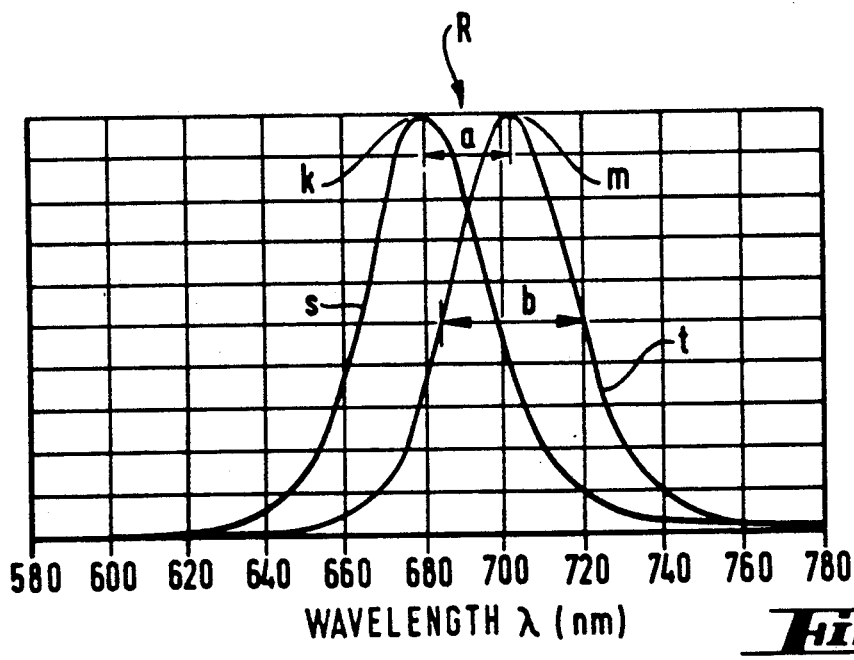

According to the invention, within each basic color, for example within the basic color of red R as shown in FIG. 11, at least two closely adjacent spectral ranges s, t are detected. The spectral ranges s, t usually overlap. The maxima k, m of immediately adjacent ranges are separated by a distance a, which corresponds to about the half-width value b of the variation of the spectral ranges s, t. This distance a amounts to about 5–35 nm, preferably about 20 nm. The measured values $M_i$ obtained in this manner (from each scanning range for each basic color) are combined by the computer unit 5a into color extract values $V_j$. These extract values are obtained for example by complementary weighting according to the linear equation $$V_j = k_{1j} \cdot M_1 + k_{2j} \cdot M_2 + \ldots + k_{nj} \cdot M_n.$$

The weighting coefficients $k_{ij}$ are such that $0 \leq k_{ij} \leq 1$ and that $k_{ij} + k_{2j} + \ldots + k_{nj} = 1$; where i represents the spectral ranges, and j the basic blue, red or green color concerned.

For the case illustrated in FIG. 11 for the example of the basic color red, the combination equation is simplified to:

$$V_{red} = k_{1red} \cdot M_1 + (1 - k_{1red}) \cdot M_2$$

By varying the weighting coefficients, the measuring light component of each basic color can be evaluated as if it had passed through a filter with different filter characteristics. The detection of at least two closely adjacent spectral ranges within each basic color therefore makes it possible to evaluate the copy master N relative to the copy material P. In this manner, by the suitable choice of the weighting coefficients the measurement may be adapted optimally to the spectral sensitivity of the copy material P used, without having to replace the filters inserted.

Figure 13:
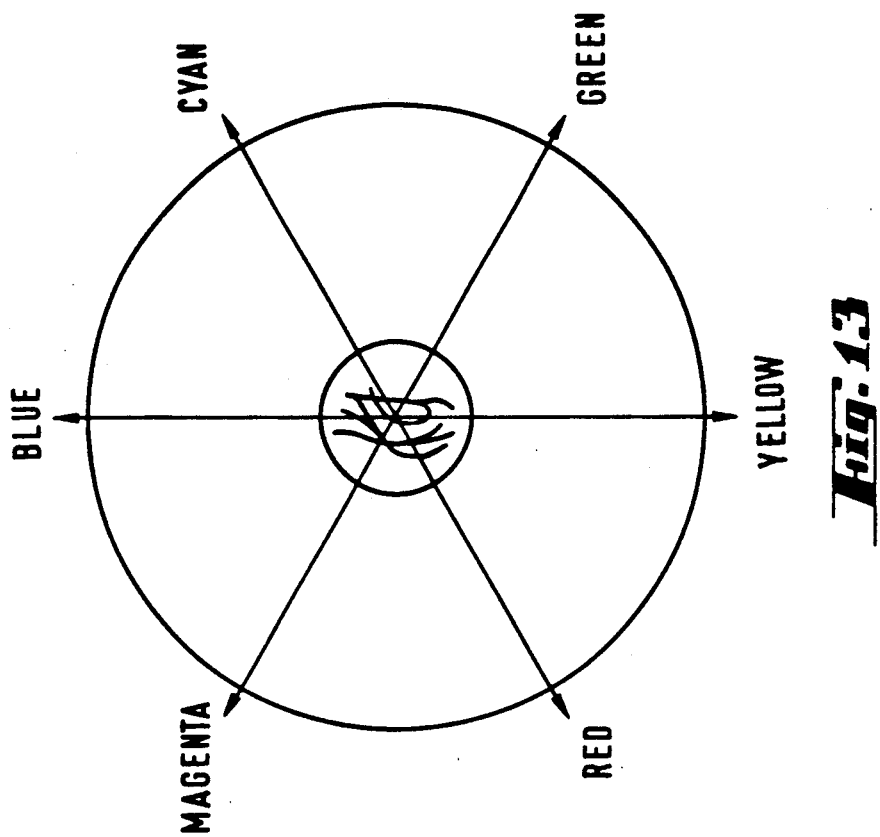
Figure 12:
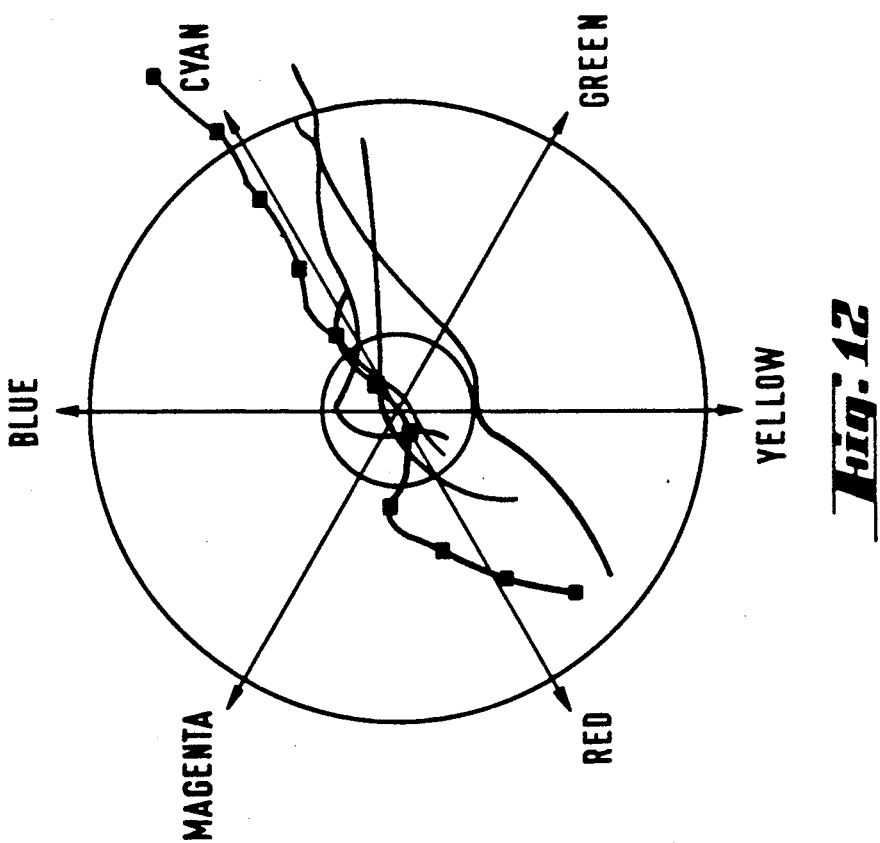

In FIGS. 12 and 13 the exposure control process according to the invention is compared with a conventional method, in which the measurement is not adapted to the spectral sensitivities of the copy material used. For this comparison an experimental series with five different types of copy masters N (types of film) and a copy material P was carried out. Each copy master was formed of a diaphragm series of a gray field, that may be established over-, standard and under-exposure. In the exposure of the copy master N on the copy material P the overexposed, standard exposed and underexposed copy masters were corrected in sequence. This was first carried out in a conventional manner without adaption of the measurement to the spectral sensitivities of the copy material and secondly according to the present invention. The results may be evaluated and the color density deviations entered in the so-called color circle. The radius r of the inner circle in the diagram amounts in each case to 0.05 density units and that of the outer circle to 0.2 density units. The color density deviations amount in the conventional process to 0.2 or more density units, as seen in FIG. 12. The deviations obtainable by the process of the present invention are shown in FIG. 13 and are all located within the inner circle with a radius of 0.05 density units, which corresponds to a reduction of the deviations to one-fourth or even less.

Via the exposure control process and the color copy apparatus of the present invention, the requirements and the different spectral sensitivities of the different copy materials used are taken into account in a simple and optimal manner. The evaluation of the copy master can always be adapted rapidly to the changing spectral sensitivities of the copy material, without having to change the measuring filter in each case. The solution is cost effective and simple to carry out and in addition allows a certain flexibility relative to the copy material used.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Process for controlling the exposure in a photographic color copying apparatus, comprising the steps of:
   photoelectrically scanning with a measuring device a plurality of scanning areas on a copy master;
   detecting with a measuring layout, for every scanning area of the copy master, each of three basic colors, within at least two closely adjacent spectral ranges;
   combining values measured from the measuring layout to obtain prevailing color extract values corresponding to color permeabilities or color densities of the copy master; and
   determining necessary quantities of copying light from the extract values according to certain given criteria.

2. Process according to claim 1, wherein spectral characteristics of the adjacent spectral ranges overlap.

3. Process according to claim 2, wherein maxima of the spectral characteristics of directly adjacent spectral ranges are separated by a distance approximately corresponding to a half-width value of the spectral ranges.

4. Process according to claim 3, wherein the distance of the maxima amounts to about 5–35 nm.

5. Process according to claim 1, wherein individual measured values are combined by complementary weighting into the prevailing color extract values.

6. Process according to claim 5, wherein the color extract values are obtained by combining the individual measured values according to:

$$V_j = k_{1j}M_1 + k_{2j}M_2 + \ldots + k_{nj}M_n$$

wherein $M_i$ represents the individual measured values, n is a number of the measured values and $k_{ij}$ are constant weighting coefficients and wherein $0 \leq k_{ij} + k_{2j} + \ldots + k_{nj} = 1$ with j representing each of the basic colors blue, red or green.

7. Process according to claim 1, wherein each of the basic colors within the closely adjacent spectral ranges are detected by separate detectors.

8. Process according to claim 1, wherein the closely adjacent spectral ranges are determined by filters.

9. Process according to claim 8, wherein dielectric bandpass interference filters are used as the filters.

10. Process according to claim 9 wherein detectors are located behind the dielectric bandpass filters in a manner such that the detectors detect different angular ranges of measuring light passing through the dielectric bandpass and thus detect different spectral ranges for each basic color.

11. Process according to claim 7, wherein measuring light for the basic colors is split into at least two components for each color and wherein each measuring light component impacts a filter, with said filters determining the basic color within the adjacent spectral ranges.

12. Process according to claim 7, wherein a measuring light for the three basic colors is split into at least two components for each color and each component of the measuring light impacts a different spectral range on a graduated filter.

13. Process according to claim 11 wherein the measuring light components are conducted to the filters via optical fibers.

14. Process according to claim 12 wherein the measuring light components are conducted to the filters via optical fibers.

15. Photographic color copying apparatus for reproducing a copy master onto a photosensitive copy material, comprising:
   a projection means;
   a measuring means for photoelectrically scanning a copy master by areas, said measuring means further comprising a wavelength selective detection device disposed in a beam path of each of three basic colors and detecting each of the basic colors within at least two closely adjacent spectral ranges;
   means for converting said detected colors into measured values;
   means for combining said measured values to obtain specific color extract values adapted to spectral sensitivity variations of a copy material; and
   exposure control means for processing the color extract values to determine quantities of copying light impacting the copying material and for adjusting said measuring means and said projection means in accordance with the determined quantities of copying light.

16. Copying apparatus according to claim 15, wherein the wavelength selective detection devices comprise filters and detector layouts correlated with the filters.

17. Copying apparatus according to claim 16, wherein a separate photoelectric detector is assigned to each filter and wherein for each basic color at least two filters having different spectral characteristics are provided.

18. Copying apparatus according to claim 17, wherein the filters are transmission filters, and wherein the transmission variations overlap within adjacent filters of each basic color.

19. Copying apparatus according to claim 18, wherein the transmission maxima of directly adjacent filters are separated by a distance corresponding to about a half-width value of the transmission variations.

20. Copying apparatus according to claim 19, wherein the distance of the transmission maxima amounts to about 5–35 nm.

21. Copying apparatus according to claim 16, wherein for each basic color at least two separate photoelectric detectors are provided for a single filter in a manner such that each detector detects a different spectral range for each basic color.

22. Copying apparatus according to claim 21, wherein the photoelectric detectors are disposed so that the spectral ranges overlap.

23. Copying apparatus according to claim 21, wherein the photoelectric detectors are disposed so that intensity maxima of immediately adjacent spectral ranges are separated by a distance approximately corresponding to a half-width value of the spectral ranges.

24. Copying apparatus according to claim 23, wherein the distance of the intensity maxima amounts to about 5-35 nm.

25. Copying apparatus according to claim 21, wherein every filter is a dielectric bandpass interference filter and the photoelectric detectors are disposed so that they detect different angular ranges of measuring light passing through the filter.

26. Copying apparatus according to claim 25, wherein the photoelectric detectors are located in concentric ranges.

27. Copying apparatus according to claim 21, wherein the filter is a graduated filter with a transmission characteristic variable over its length, and wherein means are provided to split measuring light of each basic color into at least two parts which impact the filter in different locations and subsequently impact different photoelectric detectors.

28. Copying apparatus according to claim 27, wherein for each color at least two optical fibers inserted with their outlet ends in separate plug-in orifices of a printed card located in front of the graduated filter are provided in the beam path.

29. Copying apparatus according to claim 28, wherein the graduated filter, the printed card and the photoelectric detectors are combined in a single compact unit.

* * * * *